E. R. BEEMAN.
WHEEL.
APPLICATION FILED FEB. 19, 1917.
1,307,035.
Patented June 17, 1919.
2 SHEETS—SHEET 1.
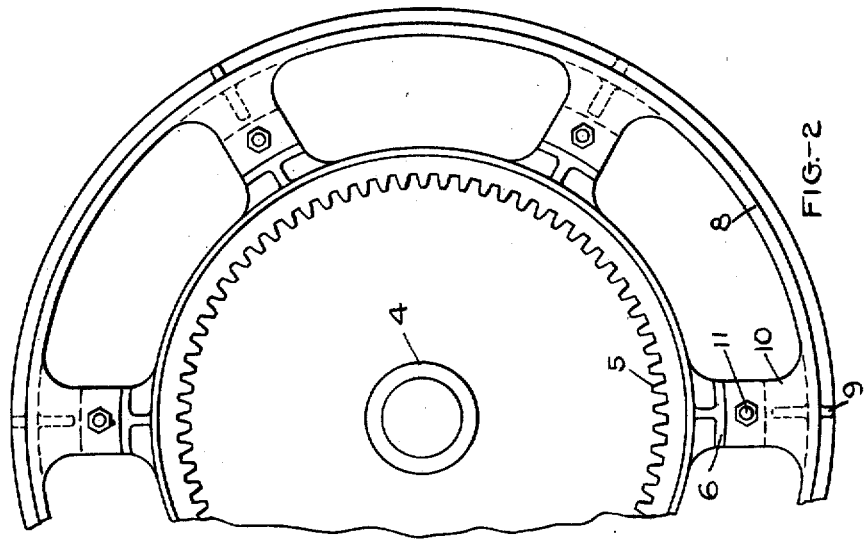
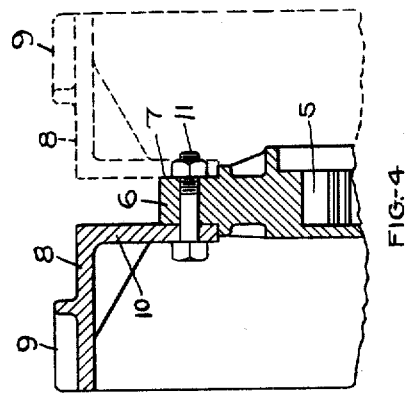
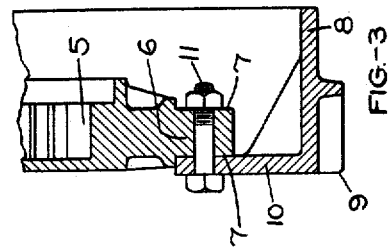
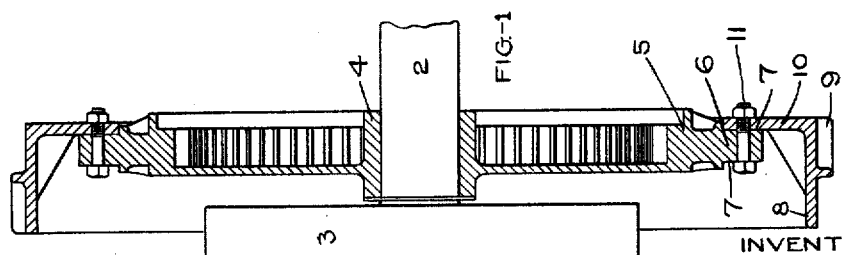
WITNESSES:
B. Hall.
E. A. Paul
INVENTOR:
EDWIN R. BEEMAN.
BY
Paul & Paul
ATTORNEYS E. R. BEEMAN.
WHEEL.
APPLICATION FILED FEB. 19, 1917.
1,307,035.
Patented June 17, 1919.
2 SHEETS—SHEET 2.
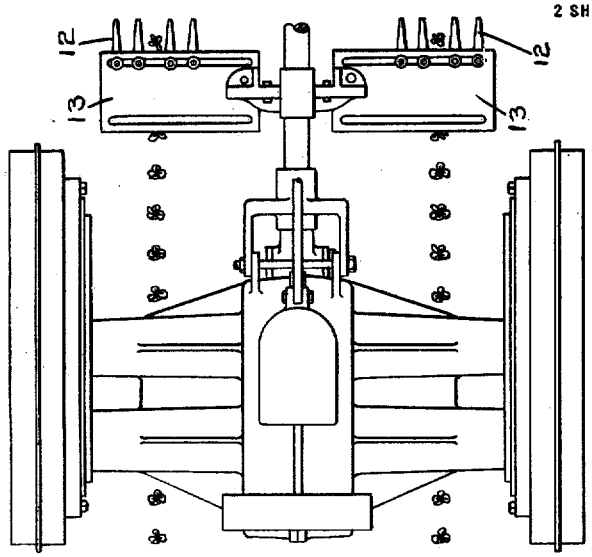
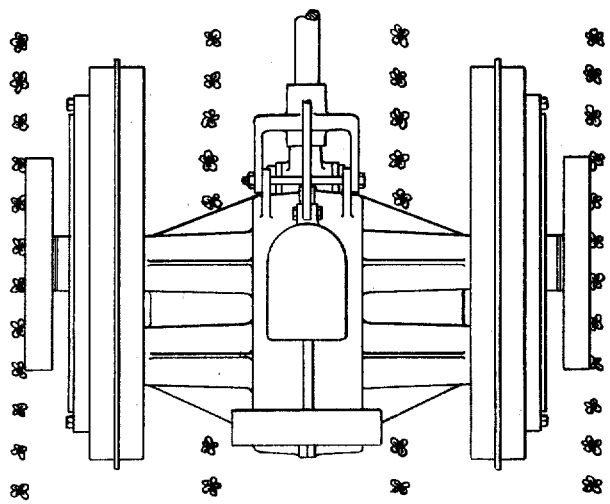
WITNESSES:
B. Hall
E. A. Paul
INVENTOR:
EDWIN R. BEEMAN
BY
Paul & Paul
ATTORNEYS

UNITED STATES PATENT OFFICE.

EDWIN R. BEEMAN, OF MINNEAPOLIS, MINNESOTA.

WHEEL.

1,307,035.

Specification of Letters Patent.    Patented June 17, 1919.

Application filed February 19, 1917. Serial No. 149,606.

*To all whom it may concern:*

Be it known that I, EDWIN R. BEEMAN, a citizen of the United States, resident of Minneapolis, county of Hennepin, State of Minnesota, have invented certain new and useful Improvements in Wheels, of which the following is a specification.

My invention relates to the tread surface of a wheel and particularly those of traction type, and the object of my invention is to provide means for increasing or decreasing the width of tread of a machine without the necessity of substituting wider or narrower wheels.

My specific object in this case is to adapt a machine of the garden tractor type for cultivating between rows of plants, the machine straddling one or more rows and the variation in the width of the machine adapting it for different distances between the rows.

The invention consists generally in various constructions and combinations, all as hereinafter described and particularly pointed out in the claims.

In the accompanying drawings forming part of this specification,

Figure 1 is a vertical sectional view through a traction wheel embodying my invention, Fig. 2 is a side view of a portion of the wheel, Fig. 3 is a detail sectional view showing the manner of securing the rim to the wheel.

Fig. 4 is a detail sectional view, showing another manner of mounting the rim to increase to a still greater extent the width of the machine, Fig. 5 is a plan view, showing the machine in position for work between the rows of plants, with the tread of the wheel adjusted for wide spaces between the rows, Fig. 6 is a similar view, showing the tread of the wheels adjusted for narrow spaces, Fig. 7 is a view, showing the rows of plants sixteen inches apart.

In the drawing, 2 represents an axle, 3 a fly wheel and 4 a hub having an internal gear ring 5 that is provided with a series of radiating lugs 6. These lugs are provided on their opposite faces with seats 7 in the plane substantially of the gear ring. 8 is a rim having traction ribs 9 thereon at intervals and provided with inwardly projecting lugs 10 which are adapted to fit the seats 7 on either side of the lugs 6 and are secured thereto by suitable means, such as bolts 11. When the rim is placed on the gear ring in the position shown in Fig. 1 and secured, it is evident that the tread of the machine will be wider than when the rim is reversed and secured in the position shown in Fig. 3, and when a still greater variation is desired, the rim may be placed in the outer seats of the lugs 6, as shown in Fig. 4, thereby setting the rim a distance greater than as shown in Fig. 1, equal to the thickness of the lugs; or, when desired, the rim may be secured to the seats of the inner faces of the lugs, as indicated by dotted lines in Fig. 4.

To make these changes or reversals, it is only necessary to remove the bolts and shift the rim from one side of the lugs to the other, or reverse it entirely, according to the width of tread of the machine desired.

In Fig. 5 I have shown the rims mounted on the wheels to adapt the machine for operating where a comparatively wide space is provided between the rows of plants, the adjustment of the rims bringing the tread of the wheels a sufficient distance from the plants to prevent any danger of injury thereto, while the cultivators or ground-working implements 12 mounted in carriers 13 are positioned to straddle the rows of plants and cultivate as near as may be desired to them.

In Fig. 6 the machine is shown with the plants arranged in rows with narrower spaces betwen them, the position of the rims of the wheels being reversed to accommodate the machine to the reduced space between the rows.

In Fig. 7 the rows of plants are shown sixteen inches apart, for which space the machine may be accommodated, while in Figs. 5 and 6 the rows are eighteen and twelve inches apart respectively.

By making the rims of the traction wheel reversible, I am able to increase or decrease the distance between the tread of the wheels and thereby adapt the machine for cultivating plants with varying distances between the rows.

In various ways the details of construction herein shown and described may be modified and still be within the scope of my invention.

I claim as my invention:

1. A traction wheel comprising a hub having an internal gear ring formed thereon, a rim having peripheral traction ribs thereon and a series of inwardly projecting members mounted on said rim at one side of the vertical axis thereof and said ring having means for securing said members thereto upon either side of the vertical axis of said ring.

2. A traction wheel comprising a hub having an internal gear ring formed thereon provided with a series of lugs radiating therefrom at intervals, said lugs having seats in their opposite vertical faces in the plane substantially of said gear ring, a rim having peripheral traction ribs thereon and provided with a series of inwardly projecting lugs adapted to fit the seats of said radiating lugs on either side thereof, and bolts passing through said lugs for securing them together.

3. A traction wheel comprising a hub having an internal gear ring formed thereon provided with members radiating therefrom at intervals, said members having seats in their opposite vertical faces in the plane substantially of said gear ring, a rim having peripheral traction ribs thereon and provided with a series of inwardly projecting members adapted to fit the seats of said radiating members on either side thereof, and means for securing said members together.

In witness whereof, I have hereunto set my hand this 13th day of February, 1917.

EDWIN R. BEEMAN.